United States Patent [19]

Labana et al.

[11] 3,959,404

[45] *May 25, 1976

[54] POWDER COATING COMPOSITIONS CONTAINING GLYCIDYL ESTER COPOLYMERS AND PHENOLIC HYDROXY TERMINATED CROSSLINKING AGENT

[75] Inventors: Santokh S. Labana, Dearborn Heights; Ares N. Theodore, Farmington, both of Mich.

[73] Assignee: Ford Motor Company, Dearborn, Mich.

[ * ] Notice: The portion of the term of this patent subsequent to Jan. 22, 1991, has been disclaimed.

[22] Filed: Dec. 18, 1973

[21] Appl. No.: 425,742

Related U.S. Application Data

[63] Continuation-in-part of Ser. No. 172,225, Aug. 16, 1971, Pat. No. 3,787,520.

[52] U.S. Cl. ............... 260/830 TW; 260/37 EP; 260/824 EP; 260/827; 260/830 R; 260/DIG. 16; 260/DIG. 17; 260/DIG. 19; 260/42; 260/42.18; 260/42.22; 260/42.28; 260/42.44
[51] Int. Cl.² ..................................... C08L 63/00
[58] Field of Search......... 260/830 TW, 836, 47 EP, 260/830 R

[56] References Cited
UNITED STATES PATENTS

| | | | |
|---|---|---|---|
| 3,070,564 | 12/1962 | Roeser | 260/836 |
| 3,222,419 | 12/1965 | Jubilee | 260/836 |
| 3,247,285 | 4/1966 | Belanger | 260/836 |
| 3,297,621 | 1/1967 | Taft | 260/836 |
| 3,595,944 | 7/1971 | Manning | 260/836 |
| 3,787,520 | 1/1974 | Labana | 260/836 |

*Primary Examiner*—Paul Lieberman
*Attorney, Agent, or Firm*—Roger L. May; Keith L. Zerschling

[57] ABSTRACT

Powder coating compositions are disclosed which, exclusive of pigments and non-reactive components, comprise a coreactive mixture of: (A) a copolymer of between about 8 and about 30 weight percent of a glycidyl ester of a monoethylenically unsaturated acid and between about 92 and about 70 weight percent of other monoethylenically unsaturated monomers, said copolymer having a glass transition temperature in the range of 40° to 90°C and a number average molecular weight ($\overline{M}_n$) of between about 2500 and about 8500; and (B) a phenolic hydroxy terminated compound in the amount of between about 0.8 and 1.2 phenolic hydroxy groups for each epoxy group in the copolymer.

20 Claims, No Drawings

POWDER COATING COMPOSITIONS CONTAINING GLYCIDYL ESTER COPOLYMERS AND PHENOLIC HYDROXY TERMINATED CROSSLINKING AGENT

This application is a continuation-in-part of application Ser. No. 172,225, filed Aug. 16, 1971 now U.S. Pat. No. 3,787,520, and relates to thermosetting powder paint compositions which are useful for providing protective and decorative surface coatings on a variety of substrates including glass, metal and other substrates which can withstand the curing temperature of the powder.

Powder coating compositions have become increasingly desirable in recent years for various reasons including those relating to ecology, health and safety. In particular, powder coating compositions are preferable to liquid paints. Such paints contain large amounts of solvents which must be volatilized after application, thus resulting in solvents escaping into the atmosphere and creating health and safety hazards as well as undesirable pollution problems. The powder coating compositions of this invention, on the other hand, release little, if any volatile material when cured. In addition, the powders have good stability at room temperature, have fast cure times at elevated temperatures and form hard coatings exhibiting excellent solvent resistance.

SUMMARY OF THE INVENTION

The powder coating compositions of this invention, exclusive of pigments and other nonreactive components, comprise a coreactable mixture of: (A) a copolymer of between 8 and about 30 weight percent of a glycidyl ester of monoethylenically unsaturated acid and between about 92 and about 70 weight percent of other monoethylenically unsaturated monomers, said copolymer having a glass transition temperature in the range of 40°C to 90°C and a number average molecular weight ($\overline{M}_n$) of between about 2500 and about 8500; and (B) a phenolic hydroxy terminated compound in the amount of between about 0.8 and 1.2 phenolic hydroxy groups for each epoxy group in the copolymer. In addition, the powder coating compositions may include additives such as catalysts, flow control agents, antistatic agents, pigments, plasticizers, etc.

PRIOR ART

The use of glycidyl methacrylate copolymers and dicarboxylic acid crosslinking agents in a liquid paint system is described in U.S. Pat. No. 2,857,354. However, the powder coating compositions of this invention are substantially different than the liquid paint compositions described in the examples of that patent. The difference can be best illustrated by attempting to prepare powder coating compositions by evaporating the solvents from the liquid paint systems described in the examples of the patent. Dry powders cannot be prepared from the compositions of Examples 4 and 5 of the patent. Powders prepared from the compositions of Examples 1, 2, 3 and 6, when deposited on a metal panel, do not fuse together to form a smooth and glossy film when the panels are baked at 150° to 200°C for 20 minutes. The baked coatings on test panels are not smooth, but rather, are rough. Also, the baked coatings exhibit very low gloss, poor adhesion and lack of flexibility. It, therefore, can be concluded that compositions which are generally suitable for liquid paints are not necessarily made suitable for powder paints merely by evaporating the solvents therefrom.

The use of a dicarboxylic acid as a crosslinking agent for glycidyl methacrylate terpolymers is mentioned in U.S. Pat. No. 3,058,947. In order to test these materials, compositions of Example VII of the patent are dried by evaporating solvents under vacuum. The materials are ground to pass through a 200 mesh screen. Samples of the ground powder are deposited on metal panels and baked at 160°C for 45 minutes. The coatings obtained show an abundance of craters, are inferior in gloss and smoothness, and lack the impact properties described in Example VII. It is, therefore, concluded that there is a substantial difference in paint films produced on a panel when the coating is produced on one hand by a liquid system and, on the other hand, by a powder system. Other improvements specific to the powders are needed in order to obtain paints of acceptable quality. The reason for the difference in properties and appearance between powder coatings derived by solvent evaporation from such liquid paints and the liquid paints themselves is not clear. It is, however, certain that the powder obtained by drying such a liquid paint composition is not useful as a powder coating composition.

DETAILED DESCRIPTION OF THE INVENTION

Epoxy Functional Copolymer

The principal material in the powder coating compositions of this invention is an epoxy functional copolymer which may be formed by conventional free radical induced polymerization of suitable unsaturated monomers. The term "copolymer" as used herein means a polymer of two or more different monomers.

The copolymers used in the invention contain between about 8 and about 30 weight percent, preferably between about 10 and about 25 weight percent, and still more preferably between about 12 and about 20 weight percent of a glycidyl ester of a monoethylenically unsaturated carboxylic acid, e.g., glycidyl acrylate and glycidyl methacrylate. These monomers provide the copolymer with its pendant epoxy functionality.

The remainder of the monomers forming the epoxy functional copolymer, i.e., between about 92 and about 70 weight percent, preferably between about 90 and about 75 weight percent, and most preferably between about 88 and about 80 weight percent, are other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning esters of both acrylic and methacrylic acids) as well as mixtures of acrylates and vinyl hydrocarbons. Preferably, in excess of 50 weight percent of the total of the copolymer monomers are esters of $C_1$–$C_{12}$ monohydric alcohols and acrylic or methacrylic acid, e.g., methyl methacrylate, ethyl acrylate butyl acrylate, butyl methacrylate, hexyl acrylate, 2-ethylhexyl acrylate, lauryl methacrylate, etc. Among the monovinyl hydrocarbons suitable for use in forming the copolymer are those containing 8 to 12 carbon atoms and including styrene, alpha methyl styrene, vinyl toluene, t-butyl styrene and chlorostyrene. When such monovinyl hydrocarbons are employed, they should constitute less than 50 weight percent of the copolymer. Other vinyl monomers such as vinyl chloride, acrylonitrile, methacrylonitrile and vinyl acetate may be included in the copolymer as modifying monomers. However, when employed, these modifying monomers should constitute only between about 0 and about 35 weight percent of the monomers in the copolymer.

The epoxy functional copolymers used in the powder coating compositions of this invention have a glass transition temperature (Tg) between about 40° and about 90°C, preferably between about 50° and about 80°C, and most preferably between about 50° and about 70°C. The molecular weight ($\overline{M}_n$) range for the copolymer may be between about 2500 and about 8500, preferably between about 3,000 and about 6,500, more preferably between about 3,000 and about 4,000. A preferred copolymer has a glass transition temperature between about 50°C and about 80°C and a molecular weight of between about 3,000 and about 6,500. A still more preferred copolymer has a glass transition temperature between about 55°C and about 70°C and a molecular weight between about 3,000 and about 4,000.

In preparing the copolymer, the epoxy functional monomer and the remaining monoethylenically unsaturated monomers are mixed and reacted by conventional free radical initiated polymerization in such proportions as to obtain the copolymer desired. A large number of free radical initiators are known to the art and are suitable for this purpose. These include: benzoyl peroxide, lauryl peroxide; t-butylhydroxy peroxide; acetylcyclohexane sulfonyl peroxide; diisobutyryl peroxide; di-(2-ethylhexyl) peroxydicarbonate; diisopropyl peroxydicarbonate; t-butylperoxypivalate; decanoyl peroxide, azobis(2-methyl-propionitrile), etc. The polymerization is preferably carried out in solution using a solvent in which the epoxy functional copolymer is soluble. Included among the suitable solvents are toluene, xylene, dioxane, butanone, etc. If the epoxy functional copolymer is prepared in solution, the solid copolymer can be precipitated by pouring the solution at a slow rate into a non-solvent for the copolymer such as hexane, octane, or water under suitable agitation conditions. The copolymer thus obtained is then further dried so that it contains less than 3 percent of the materials that volatilize at the temperatures used for baking the coatings. Alternatively, the copolymer can be obtained by evaporating the solvents under vacuum or by employing spray drying techniques.

These copolymers can also be prepared by emulsion polymerization, suspension polymerization, bulk polymerization or other suitable methods. In these methods of preparing the copolymers, chain transfer agents may be required to control the molecular weight of the copolymer to a desired range. However, when the chain transfer agents are used care must be taken so that they do not decrease the shelf stability of the powder by causing premature chemical reaction. The solid copolymers obtained by these methods must also be dried to contain less than 3% of the materials that volatilize at the temperatures used for baking the coatings.

The molecular weight and molecular weight distribution of the epoxy functional copolymer is important in obtaining outstanding powder coating compositions. While the molecular weight ($\overline{M}_n$) ranges from about 2500 to about 8500, the copolymer component must not contain significant amounts of higher molecular weight fractions. No more than 5 percent of the copolymer should be of molecular weight greater than 20,000 and the molecular weight distribution as measured by the ratio of weight average molecular weight to number average molecular weight ($\overline{M}_w/\overline{M}_n$) should be in the range of 1.6 to 3.0. The preferred range of molecular weight distribution is in the range of 1.7 to 2.2.

Phenolic Hydroxy Terminated Compound

The phenolic hydroxy terminated compound serves as a crosslinking agent for the epoxy functional copolymer and is present in an amount ranging from about 0.8 to about 1.2 phenolic hydroxy groups for each epoxy group in the copolymer. Among the preferred phenolic hydroxy compounds which may be employed as crosslinking agents are diphenols and phenolic hydroxy terminated resins.

The diphenols used as crosslinking agents in the powder coating compositions of this invention preferably have a molecular weight in the range of from about 110 to about 550. Among the many diphenols falling within that molecular weight range are those selected from the group consisting of: bisphenol A; dihydroxydiphenyl sulfone; 1,1' bis(4-hydroxyphenyl) cyclohexane; 2,2'-biphenol; 4,4'-biphenol; 1,3-dihydroxynaphthalene; bis(2-hydroxyphenyl) methane; 4,4'dihydroxydiphenyl sulfide; 4,4' dihydroxydiphenol oxide; bis(4hydroxyphenyl) methane; hydroquinone and 2-2'-bis(4-hydroxyphenyl) butane. The preferred diphenols, however, are bisphenol A; dihydroxydiphenyl sulfone, bis(2-hydroxyphenyl) methane and 4,4' dihydroxydiphenyl sulfide with bisphenol A and dihydroxydiphenyl sulfone being the most desirable.

Among the many phenolic hydroxy terminated resins which may be included in the powders of the invention are phenolic hydroxy terminated ethers preferably having a molecular weight in the range of 600 to 3,000. Such ethers may be prepared by reacting one equivalent weight of an epoxy resin having a molecular weight in the range of about 250 to about 2,000 and one and a half to three equivalent weights of a diphenol having a molecular weight of from about 110 to about 550.

Among the suitable epoxy resins for forming the phenolic hydroxy terminated polymers are: Epon 828 (Shell Oil Co.; Epoxide Equivalent, 175–210; Average Molecular Weight-380); Epon 829 (Shell Oil Co.; Epoxide Equivalent, 175–210; Average Molecular Weight-380), and DER 332 (Dow Chemical Co.; Epoxide Equivalent, 175; Average Molecular Weight-355). These epoxy resins have the common structural formula:

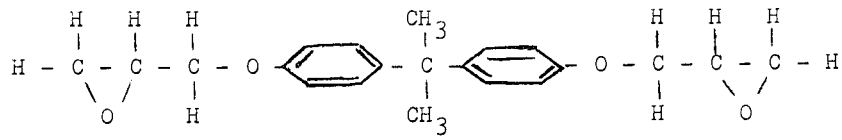

These epoxy resins are reacted with diphenols to produce the phenolic hydroxy terminated ether which may be used as one of the crosslinking agents suitable for the powder coating composition of this invention. The greater molecular weight ethers are produced by increasing the amount of epoxy resin used in the reaction so that the intermediate portion of the ether is formed with a higher molecular weight. The diphenol and epoxy resin may be either fully reacted to form the crosslinking agent or only semi-reacted to form the cross-linking agent. When the diphenol and the resin are only semi-reacted, the completion of the reaction therebetween takes place during the baking of the powder coating composition to produce a finished coating. The technique of semi-reaction is used when the fully reacted ether is not suitable for powdering and the semi-reacted materials are suitable for powdering. The use of diphenolic hydroxy terminated cross-linking agents which are not friable powders, but are viscous liquids, or are difficult to grind, is limited so that the weight percentage of such a crosslinking agent is limited to a minor constituent of the powder. Diphenolic hydroxy terminated, saturated polyesters may also be used as cross-linking agents.

Some of the diphenols suitable for reacting with the epoxy resins are as follows: bisphenol A; dihydroxydiphenyl sulfone; 1,1′ bis(4-hydroxyphenyl) cyclohexane; 2,2′-biphenol; 4,4′-biphenol; 1,3-dihydroxynaphthalene; bis (2-hydroxyphenyl) methane; 4,4′ dihydroxydiphenyl sulfide; 4-4′ dihydroxydiphenyl oxide; bis(4-hydroxyphenyl) methane and 2-2′-bis (4-hydroxyphenyl) butane.

Additional Additives

The coating compositions formed in accordance with the teachings of this invention may include a small amount, generally from about 0.05 percent by weight to about 1.0 percent by weight of the total weight of the powder composition, of a catalyst in order to increase the crosslinking rate of the powder coating during baking. Baking temperatures ordinarily are in the range of about 130° to about 200°C and the catalyst should produce a gel time at the baking temperature of between about one minute and about 40 minutes. Preferably, however, the gel time is in the range of about 1 to about 12 minutes and most preferably is in the range of about 2 to about 8 minutes. Among the many suitable catalysts, which are preferably solid at room temperature and have a melting point of from 50° to 200°C are tetraalkylammonium salts, imidazole type catalysts, tertiary amines and metal salts of organic carboxylic acids. Suitable tetraalkyl ammonium salt catalysts include: tetrabutyl ammonium chloride (bromide or iodide); tetraethyl ammonium chloride (bromide or iodide); tetramethyl ammonium chloride (bromide or iodide); trimethyl benzyl ammonium chloride, dodecyl dimethyl (2-phenoxyethyl)ammonium bromide and diethyl (2-hydroxy ethyl) methyl ammonium bromide. Suitable catalysts of the imidazole type include: 2-methyl-4-ethyl imidazole, 2-methyl imidazole, imidazole, 2-[(N-benzylanilino) methyl] - 2-imidazoline phosphate and 2-benzyl-2-imidazoline hydrochloride. Suitable tertiary amine catalysts for the powder coating compositions of this invention include: triethylenediamine, N,N-diethylcyclohexylamine, and N-methyl morpholine. The metal salts of organic carboxylic acids which are catalysts for the powder coatings of the invention include, but are not limited to: stannous octoate, zinc naphthenate, cobalt naphthenate, zinc octoate, stannous 2-ethylhexoate, phenylmercuric propionate, lead neodecanoate, dibutyl tin dilaurate and lithium benzoate. The powder paint composition also may advantageously include a flow control agent in an amount ranging from about 0.05 to about 4.0 weight percent of the total powder composition. In general the flow control agent should be a polymer having a number average molecular weight of at least 1,000 and a glass transition temperature at least 50°C below the glass transition temperature of the epoxy functional copolymer. This flow control agent may be an acrylic polymer which may be prepared by polymerization of acrylate and methacrylate monomers in bulk or in suitable solvents using well known free radical initiators. The amount of initiator and polymerization conditions are chosen so that the polymer has a molecular weight ($\overline{M}_n$) above 1,000, preferably above 5,000 and most preferably between about 6,000 and about 20,000. Among the preferred acrylic polymers useful as flow control agents are polylauryl acrylate, polybutyl acrylate, poly(2-ethylhexyl acrylate), polylauryl methacrylate and polyisodecyl methacrylate.

Although acrylate flow control agents are preferred, fluorinated polymers having a surface tension, at the baking temperature of the powder, lower than that of the copolymer used in the mixture may be employed. Preferred flow control agents, if the agent is a fluorinated polymer are esters of polyethyleneglycol or polypropylene glycol and fluorinated fatty acids. For example, an ester of polyethyleneglycol of molecular weight of over 2,500 and perfluorooctanoic acid is a useful flow control agent. Polymeric siloxanes of molecular weight over 1,000, advantageously 1,000 to 20,000, may also be useful as flow control agents, e.g., alkyl substituted siloxanes such as polydimethyl siloxane, polymethylphenyl siloxane, etc. polydiphenyl siloxane and halogenated siloxanes such as poly(3,3,3-trifluoropropylmethyl siloxane), poly (perfluorodimethyl siloxane), poly(pentafluorophenylmethyl siloxane), etc.

Since the powder coating compositions of the invention may be applied to articles by electrostatic spray techniques, the composition may include a small weight percent of an anti-static agent. In particular, the anti-static agent is included in a range of from about 0.05 to about 1.0 weight percent of the total powder composition. Suitable antistatic agents include, but are not limited to, tetraalkyl ammonium salts as discussed previously and which also serve as catalysts. Other suitable antistatic agents include: alkyl poly(ethyleneoxy) phosphate or alkylaryl poly(etheleneoxy) phosphates such as ethyl benzyl poly(ethyleneoxy) phosphate; polyethyleneimine; poly(2-vinyl pyrrolidone); pyridinium chloride; poly(vinyl pyridinium chloride); polyvinyl alcohol; and inorganic salts.

A plasticizer may be used in the powder coating compositions of this invention if desired. The types of plasticizers used very often include adipates, phosphates, phthalates, sebacates, polyesters derived from adipic acid or azelaic acid, and epoxy or epoxidized plasticizers. Exemplary of the many plasticizers which may be employed are: dihexyl adipate; diisooctyl adipate; dicyclohexyl adipate; triphenyl phosphate; tricresyl phosphate; tributyl phosphate; dibutyl phthalate; dioctylphthalate; butyl octyl phthalate; dioctyl sebacate; butyl benzyl sebacate; dibenzyl sebacate, butanediol-1,4-diglycidyl ether and cellulose acetate butyrate.

In order to give individual powder coating compositions a suitable color, a pigment may be included. In general the pigment forms from about 6 to about 35 weight percent of the total powder coating composition. Pigments which are suitable for powder coating compositions include, but are not limited to the following: basic lead silica chromate, 30 percent by weight (orange); titanium dioxide, 30 percent by weight (white); titanium dioxide, 15 weight percent, plus ultra marine blue, 10 weight percent (blue); phthalocyanine blue, 7 weight percent, plus titanium dioxide, 10 weight percent (blue); phthalocyanine green, 7 weight percent, plus titanium dioxide, 10 weight percent (green); ferrite yellow, 7 weight percent, plus titanium dioxide, 10 weight percent (yellow); carbon black, 6 weight percent (black); black iron oxide, 10 weight percent (black); chromium green oxide, 8 weight percent, plus titanium dioxide, 10 weight percent (green); quindo red, 5 weight percent, plus titanium dioxide, 16 weight percent (red); and iron oxide transparent orange pigment, 10 weight percent (orange). Metallic pigment such as aluminum may also be included up to 10 weight percent to give the baked coating a metallic appearance.

Having described the various materials which are employed in formulating the powder coating compositions of this invention, a plurality of examples are hereinafter set forth to illustrate the same. It should be understood that the specific examples are presented by way of illustration and not by way of limitation.

EXAMPLE I

The monomers, glycidyl methacrylate 15 percent by weight, methyl methacrylate 45 percent by weight and butyl methacrylate 40 percent by weight are mixed together. Three weight percent of a catalyst 2,2'-azobis-(2-methylpropionitrile) (AIBN) is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature (109°–112°C) with only a small fraction of heat supplied from an external heater. After the addition of the monomer mixture is complete, the refluxing is maintained by external heat source for 3 additional hours.

The solution is poured into shallow stainless steel trays. These trays are placed in a vacuum oven and the solvent evaporated therefrom. As the solvent is removed, the copolymer solution becomes more concentrated. The temperature of the vacuum oven is raised to about 110°C. Drying is continued until the solvent content of the copolymer is below 3 percent. The trays are cooled and the copolymer collected and ground to pass through 20 mesh screen. The copolymer has a glass transition temperature of 53°C and a molecular weight ($\overline{M}_n$) of 4000.

A phenolic hydroxy terminated resin is prepared in the following manner. Thirty-eight grams of Epon 829 is charged into a 500 ml stainless steel beaker having a heating mantle. The epoxy resin is heated to 150°C. As the resin is stirred, 45.6 grams of bisphenol A is added over a 10 minute period. The temperature of the mixture is maintained at 150°C for 1.5 hours while the mixture is stirred. The reacted mixture is pored out into an aluminum pan and cooled. The solid mixture, having a molecular weight of 836, is ground to pass through a 100 mesh screen. A portion of the phenolic hydroxy terminated resin is weighed out for making a powder coating composition of this invention.

One hundred parts by weight of the ground copolymer are mixed with the following materials:

| | |
|---|---|
| Phenolic hydroxy terminated resin | 44 parts |
| Tetrabutyl ammonium bromide | 0.2 parts |
| Polylauryl acrylate ($\overline{M}_n$=10,000) | 0.5 parts |
| Titanium dioxide | 30 parts |

The materials are mixed together in a ball mill for 2 hours. The mixture is milled rolled at 85° to 90°C for 5 minutes. The solid obtained is ground in a ball mill to pass through a 140 mesh screen.

The resulting powder thus obtained is a powder coating composition of the invention. The powder is sprayed on an electrically grounded, steel panel by using an electrostatic powder spray gun operating at 50 KV charging voltage. After spraying, the panel is heated at 175°C for 20 minutes.

The coating obtained on the panel has good adhesion to the steel panel and good impact strength. The coating also is applied to and has good adhesion on panels of glass, brass, zinc, aluminum, copper and bronze. The coating obtained is not soluble in toluene, gasoline, butanone or methanol.

EXAMPLE II

The procedure of Example I is repeated with the exception that 12.0 parts of bisphenol A is substituted for the phenolic hydroxy terminated resin. The powder is sprayed on an electrically grounded steel panel as per Example I and the coating exhibits good adhesion and good impact strength. The coating is also applied to and has good adhesion on panels of glass, brass, zinc, aluminum, copper and bronze. The coating obtained is not soluble in toluene, gasoline, butanone or methanol.

EXAMPLE III

The procedure of Example I is repeated with the exception that: (1) the copolymer comprises 8 percent by weight glycidyl methacrylate, 52 percent by weight methyl methacrylate and 40 percent by weight butyl methacrylate and has a glass transition temperature of 58°C and a molecular weight of 4,000; (2) the phenolic hydroxy terminated resin is formed by reacting 76 grams of Epon 829 with 68.4 grams of bisphenol A in the 500 ml stainless steel beaker, the resulting resin having a molecular weight of 1,444. The quality of painted panels is about the same as achieved in Example I.

EXAMPLE IV

The procedure of Example I is repeated with the exception that: (1) the copolymer comprises 8 percent by weight glycidyl methacrylate, 52 percent by weight methyl methacrylate and 40 percent by weight butyl methacrylate and has a glass transition temperature of 58°C and a molecular weight of 4,000; (2) 6.4 parts of bisphenol A is substituted for the phenolic hydroxy terminated compound. The quality of the painted panels obtained after application of the powder coating to various materials is about the same as achieved in Example II.

EXAMPLE V

A monomer mixture having the following composition is prepared: glycidyl acrylate 12 percent by weight, methyl methacrylate 58 percent by weight, and butyl methacrylate 30 percent by weight. The monomer mixture is processed in the same manner as described in Example I with 3 percent by weight of the catalyst AIBN employed. A phenolic hydroxy terminated polymer is prepared as described in Example I except 114 grams Epon 829 and 91.2 grams of bisphenol A are reacted to produce a resin having a molecular weight of 2052. One hundred parts of the copolymer is mixed with the same additional ingredients described in Example I, except 86.5 parts of the phenolic hydroxy terminated powder prepared are used.

The powder coating composition obtained by following the process steps set forth in Example I is applied to test panels in the same manner as described in Example I. The coating is baked at a temperature of 170°C for 30 minutes. the coating obtained has good adhesion to steel, glass, brass, zinc, aluminum, copper and bronze.

EXAMPLE VI

The procedure of Example V is repeated with the exception that 10.5 parts of dihydroxydiphenol sulfone is substituted for the phenolic hydroxy terminated polymer. The coatings are baked at 170°C for 30 minutes and show good adhesion to steel, glass, brass, zinc, aluminum, copper and bronze.

EXAMPLE VII

A monomer mixture having the following composition is prepared: glycidyl methacrylate 20 percent by weight, methyl methacrylate 40 percent by weight and butyl methacrylate 40 percent by weight. A copolyer is formed this monomer mixture in accordance with the same procedure as is outlined in Example I. In this case, 1 percent by weight of the catalyst AIBN is added. The copolymer produced has a glass transition temperature of 51°C and a molecular weight of 8500.

A phenolic hydroxy terminated resin is prepared as described in Example I. In this case, however, 38 grams of Epon 829 is reacted with 38 grams of 4,4' biphenol to produce a resin having a molecular weight of 760.

The ground copolymer (100 parts by weight) is added to the following materials:

| | |
|---|---|
| Phenolic hydroxy terminated resin | 53.5 parts |
| Tetrabutylammonium chloride | 0.1 parts |
| Polybutylacrylate ($\overline{M}_n$=9000) | 4 parts |
| Titanium dioxide | 15 parts |
| Transparent blue | 4 parts |
| Metallic aluminum flakes | 4 parts |

The above ingredients are mixed together and processed in accordance with the precedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 200°C for 10 minutes is of good quality, is solvent and scratch resistant, and has a metallic appearance.

EXAMPLE VIII

To 100 parts by weight of ground copolymer prepared in accordance with Example VII is added the following:

| | |
|---|---|
| Bisphenol A | 17.5 parts |
| Tetrabutylammonium chloride | 0.1 parts |
| Polybutylacrylate ($\overline{M}_n$=9000) | 4 parts |
| Titanium dioxide | 15 parts |
| Transparent blue | 4 parts |
| Metallic aluminum flakes | 4 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 200°C for 10 minutes is of good quality, is solvent and scratch resistant and has a metallic appearance.

EXAMPLE IX

A monomer mixture having the following composition is prepared: glycidyl acrylate 25 percent by weight, methyl methacrylate 50 percent by weight and butyl methacrylate 25 percent by weight. The monomers are reacted as described in Example I to produce a copolymer. In this case, 6 percent by weight of the catalyst AIBN is employed.

A phenolic hydroxy terminated resin is prepared as described in Example I. In this case, however, 70 grams of DER 332 is reacted with 75 grams of dihydroxydiphenyl sulfone and 0.8 grams tetrabutyl ammonium iodide (catalyst) to produce a resin having a molecular weight of 1450.

One hundred parts by weight of the copolymer obtained is mixed with the following materials:

| | |
|---|---|
| Phenolic hydroxy terminated resin | 128 parts |
| 2-methyl-4-ethylimidazole | 0.05 parts |
| Dibutyl poly(ethyleneoxy phosphate) | 0.05 parts |
| Polyisododecyl methacrylate | 4 parts |
| Titanium dioxide | 10 parts |
| Phthalocyanine blue | 7 parts |

A powder coating composition is obtained by following the process steps set forth in Example I. The coating composition is applied to a series of test panels and baked at the temperature of and for the same time as Example VII. The coating obtained on the various test panels is of good quality with respect to its adhesion, appearance and impact characteristics.

EXAMPLE X

The procedure of Example IX is repeated with the exception that 19.8 parts of dihydroxy diphenyl sulfone is substituted for the phenolic hydroxy terminated resin. The coating composition is applied to a series of test panels and baked at 170°C for 30 minutes. The coatings obtained on the various test panels is of poor quality with respect to adhesion, appearance and impact characteristics.

EXAMPLE XI

A monomer mixture having the following composition is prepared: glycidyl methacrylate 15 percent by weight, butyl acrylate 20 percent by weight and methyl methacrylate 65 percent by weight. The monomer is reacted as set forth in Example I in order to produce a copolymer. Four percent by weight of the catalyst AIBN is employed in reacting the monomer mixture to form the copolymer. The copolymer has a glass transition temperature of 50°C and a molecular weight of 3000.

A phenolic hydroxy terminated resin is prepared as described in Example I. In this case, however, 35 grams of DER 332 is reacted with 50 grams of dihydroxydiphenyl sulfone and 0.5 grams of tetrabutyl ammonium iodide (catalyst) to produce a resin having a molecular weight of 850.

One hundred parts by weight of the copolymer obtained is added to the following materials:

| | |
|---|---|
| Phenolic hydroxy terminated resin | 45 parts |
| Triethylene diamine | 0.1 parts |
| Tetraethylammonium chloride | 0.5 parts |
| Polylaurylmethacrylate ($\bar{M}_n$=6000) | 2 parts |
| Phthaloycanine green | 7 parts |
| Titanium dioxide | 10 parts |

The above described materials are processed as described in Example I in order to produce a powder coating composition. The powder coating composition is applied to test panels as described in Example I and baked on the panels at a temperature of 150°C for 15 minutes.

The coating obtained has good adhesion to steel, glass, brass, zinc, aluminum, copper and bronze and is insoluble in toluene, gasoline, methanol and butanone.

EXAMPLE XII

The procedure of Example XI is repeated with the exception that 12.7 parts of 2,2′-bis(4-hydroxyphenyl) butane is substituted for the phenolic hydroxy terminated resin. The powder coating composition is applied to test panels as described in Example I and baked at a temperature of 150°C for 15 minutes. The coating obtained exhibits good adhesion to steel, glass, brass, zinc, aluminum, copper and bronze and is insoluble in toluene, gasoline, methanol and butanone.

EXAMPLE XIII

A monomer mixture having the following composition is prepared: glycidyl methacrylate 15 percent by weight, methyl methacrylate, 50 percent by weight and styrene 35 percent by weight. The monomers are reacted in accordance with the procedure set forth in Example I with 3 percent by weight of the catalyst AIBN being utilized. The resulting ground copolymer has a molecular weight of 4500 and a glass transition temperature of 90°C.

A phenolic hydroxy terminated resin is prepared as described in Example I. In this case, however, 38 grams of Epon 828 reacted with 54 grams of 1,1′ bis(4-hydroxyphenyl) cyclohexane and 0.6 grams of tetrabutyl ammonium iodide (catalyst) to produce a resin having a molecular weight of 916.

One hundred parts by weight of the copolymer obtained is added to the following materials:

| | |
|---|---|
| Phenolic hydroxy terminated resin | 49 parts |
| Tetramethylammonium chloride | 1 part |
| Poly(2-ethylhexyl acrylate) | 2 parts |
| Ferrite yellow | 7 parts |
| Titanium dioxide | 10 parts |

This mixture is processed as described in Example I in order to form a powder coating composition. The powder coating composition is applied to test panels as described in Example I. The panels are baked at a temperature of 180°C for 5 minutes. The adhesion quality of the powder coating after baking on the various test panels is good. The coating on each panel possesses good solvent and scratch resistance.

EXAMPLE XIV

The procedure of Example XIII is repeated with the exception that 13.2 parts of dihydroxydiphenyl sulfone is substituted for the phenolic hydroxy terminated resin. The powder is applied to panels which are baked at 180°C for 5 minutes. The adhesion quality of the powder coating after baking on the various test panels is good. The coating on each panel possesses good solvent and scratch resistance.

EXAMPLE XV

A monomer mixture having the following composition is formed: glycidyl acrylate 18 percent by weight, ethyl acrylate 15 percent by weight, methyl methacrylate 45 percent by weight, vinyl chloride 22 percent by weight. The monomer mixture is polymerized by using 2 weight percent of AIBN as the initiator.

A phenolic hydroxy terminated resin is prepared as described in Example I. In this case, however, 38 grams of Epon 829 is reacted with 32 grams of 1,3 dihydroxynapthalene to produce a resin with a molecular weight of 700.

One hundred parts of the ground copolymer obtained is added to the following materials:

| | |
|---|---|
| Phenolic hydroxy terminated resin | 49 parts |
| Trimethyl benzyl ammonium chloride | 0.1 parts |
| Poly (2-ethylhexyl acrylate) ($\bar{M}_n$=11,000) | 2 parts |
| Carbon black | 6 parts |

The above materials are mixed and processed as set forth in Example I. The resulting powder coating composition is applied to test panels as specified in Example I. The coating composition is baked at 170°C for 15 minutes. All the painted panel exhibit good adhesion and solvent resistant properties.

EXAMPLE XVI

The procedure of Example XV is repeated with the exception that 11.4 parts of Bis(2-hydroxyphenyl) methane is substituted for the phenolic hydroxy terminated polymer. The resulting powder composition is applied to test panels as specified in Example I and baked at 170°C for 15 minutes. All the painted panels exhibit good adhesion and solvent resistance.

EXAMPLE XVII

A monomer mixture having the following composition is formed: glycidyl methacrylate 15 percent by weight, methyl methacrylate 30 percent by weight, isobutyl acrylate 25 percent by weight, alpha methyl styrene 15 percent by weight and methacrylonitrile 15% by weight. The monomer mixture is reacted in the same manner as described in Example I. Three percent of the catalyst AIBN is employed. The resulting copolymer has a glass transition temperature of 46°C and a molecular weight of 4500.

A phenolic hydroxy terminated resin is prepared as described in Example I. In this case, however, 38 grams of Epon 829 is reacted with 40 grams of bis(2-hydroxyphenyl) methane to produce a resin having a molecular weight of 780.

One hundred parts of the ground copolymer obtained is added to the following materials:

| | |
|---|---|
| Phenolic hydroxy terminated resin | 41 parts |
| Dodecyldimethyl (2-phenoxy-ethyl) ammonium bromide | 0.5 parts |
| Polyethylene glycol perfluoro ($\bar{M}_n$=3400) | 2 parts |
| Black iron oxide | 10 parts |

The mixture so formed is processed as described in Example I to produce a powder coating composition. This powder coating composition is applied to test panels as it is described in Example I. The coated panels are baked at 165°C for 15 minutes. The coating on each panel has good adhesion and solvent resistance.

EXAMPLE XVIII

The procedure of Example XVII is repeated with the exception that 29.0 parts of tetrabromobisphenol A is substituted for the phenolic hydroxy terminated polymer. The resultant powder is applied to test panels as described in Example I and baked at 165°C for 15 minutes. The coating on each panel has good adhesion and solvent resistance.

EXAMPLE XIX

A monomer mixture having the following composition is prepared: glycidyl methacrylate 5 percent by weight, methyl methacrylate 55 percent by weight, and butyl methacrylate 40 percent by weight. The monomer mixture is reacted as described in Example I with 6 percent by weight of the catalyst AIBN. The resulting copolymer has a glass transition temperature of 55°C and a molecular weight of 3000.

A phenolic hydroxy terminated resin is prepared as described in Example I by reacting 38 grams of Epon 829 with 44 grams of 4,4' dihydroxydiphenyl sulfide to produce a resin having a molecular weight of 816.

One hundred parts by weight of the ground copolymer is mixed with the following materials:

| | |
|---|---|
| Phenolic hydroxy terminated resin | 14.5 parts |
| Tetraethylammonium bromide | 1 part |
| Ethyl benzyl (ethyleneoxy) phosphate | 5 parts |
| Poly (2-ethylhexyl acrylate) | 0.4 parts |
| Chromium green oxide | 8 parts |
| Titanium dioxide | 10 parts |

The above mixture is processed as described in Example I to produce a powder coating composition. The powder coating composition is applied to a plurality of test panels. The panels are baked at a temperature of 170°C for 20 minutes. The adhesion to the test panels of the powder coating material is poor and coating has a tendency to chip and crack.

EXAMPLE XX

The procedure of Example XIX is repeated with the exception that 4.0 parts of bisphenol A is substituted for the phenolic hydroxy terminated resin. The powders so formed are applied to a plurality of test panels and baked at 170°C for 20 minutes. The adhesion to the test panels is poor and the coating has a tendency to crack.

EXAMPLE XXI

A monomer mixture is formed having the following composition: glycidyl methacrylate 12 percent by weight methyl methacrylate 50 percent by weight, 2-ethylhexyl acrylate 10 percent by weight and acrylonitrile 28 percent by weight. The monomer mixture is processed as set forth in Example I in order to form a copolymer. Four percent by weight of the catalyst AIBN is added. The copolymer formed has a glass transition temperature of 60°C and a molecular weight of 4,000.

A phenolic hydroxy terminated resin is prepared as described in Example I by reacting 152 grams of Epon 829 with 114 grams of bisphenol A to produce a resin having a molecular weight of 2660.

One hundred parts by weight of the ground copolymer is mixed with the following materials:

| | |
|---|---|
| Phenolic hydroxy terminated resin | 112 parts |
| Stannous octoate | 0.5 parts |
| Tetraethylammonium bromide | .05 parts |
| Polyethylene glycol perfluoro octoate ($\bar{M}_n$=3500) | 2 parts |
| Quindo red | 4 parts |
| Metallic aluminum flakes | 4 parts |

The mixture above described is processed as set forth in Example I to produce a powder coating composition. The powder coating composition is applied to test panels as described in Example I. The panels are baked at 150°C for 20 minutes. The adhesion to the panels of the powder coating is good, each of the coatings possess good solvent resistance and has a metallic appearance.

EXAMPLE XXII

The procedure of Example XXI is repeated with the exception that 8.4 parts of Bis(4-hydroxyphenyl) methane is substituted for the phenolic hydroxy terminated resin. The resultant coating is applied to test panels and baked at 150°C for 20 minutes. The adhesion to the panels is good, each of the coatings possesses good solvent resistance and each has a metallic appearance.

EXAMPLE XXIII

A monomer mixture having the following composition is prepared: glycidyl methacrylate 22 percent by weight, n-hexyl methacrylate 20 percent by weight, butyl methacrylate 25 percent by weight and acrylonitrile 33 percent by weight. A copolymer is formed from this monomer mixture in accordance with the same procedure as is outlined in Example I. In this case, 1.5 percent by weight of the catalyst AIBN is added. The copolymer produced has a glass transition temperature of 40°C and a molecular weight of 7500.

A phenolic hydroxy terminated resin is prepared as described in Example I. In this case, however, 38 grams of Epon 829 is reacted with 40.5 grams of 4,4' dihydroxydiphenyl oxide to produce a resin with a molecular weight of 784.

The ground copolymer (100 parts by weight) is added to the following materials:

| | |
|---|---|
| Phenolic hydroxy terminated resin | 61 parts |
| Zinc octoate | 0.8 parts |
| Tetrabutylammonium iodide | 1.0 parts |
| Polybutyl acrylate | 2.0 parts |
| Iron oxide transparent orange | 4 parts |

-continued

| Metallic aluminum flakes | 4 parts |

The above ingredients are mixed together and processed in accordance with the procedure of Example I to obtain a powder coating composition. The powder coating composition is sprayed on various test panel of steel, glass, brass, zinc, aluminum, copper and bronze. The coating obtained on each test panel after curing of the powder coating composition at a temperature of 140°C for 20 minutes is of good quality and is solvent and scratch resistant.

EXAMPLE XXIV

The procedure of Example XXIII is repeated with the exception that 18.7 parts of 2-2'-bis(4-hydroxyphenyl) butane is substituted for the phenolic hydroxy terminated resin. The resultant powder is sprayed on test panels of steel, glass, brass, zinc, aluminum, copper and bronze. The coating obtained on each test panel after curing at 140°C for 20 minutes is of good quality, has a metallic appearance, and is solvent and scratch resistant.

EXAMPLE XXV

A monomer mixture having the following composition is prepared: glycidyl acrylate 10 percent by weight, methyl methacrylate 50 percent by weight, butyl methacrylate 30 percent by weight and vinyl acetate 10 percent by weight. A copolymer is formed from this monomer mixture in accordance with the same procedure as is outlined in Example I. In this case, 3 percent by weight of the catalyst AIBN is added.

A phenolic hydroxy terminated resin is prepared as described in Example I. In this case, however, 38 grams of Epon 829 is reacted with 40 grams of bis(4-hydroxyphenyl) methane to produce a resin having a molecular weight of 780.

The ground copolymer (100 parts by weight) is added to the following materials:

| Phenolic hydroxy terminated resin | 31.2 parts |
| Tetrabutylammonium bromide | 2 parts |
| Poly (2-ethylhexyl acrylate) | 3.5 parts |
| Carbon black | 6 parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 160°C for 10 minutes is of good quality. Also, the coating obtained on each test panel is insoluble in toluene, gasoline, methanol and butanone.

EXAMPLE XXVI

The procedure of Example XXV is repeated with the exception that 7.1 parts of 4-4' dihydroxyphenyl oxide is substituted for the phenolic hydroxy terminated polymer. The resultant powder is applied to test panels and cured at 160°C for 10 minutes. The coatings are of good quality and are insoluble in toluene, gasoline, methanol and butanone.

EXAMPLE XXVII

A monomer mixture having the following composition is prepared: glycidyl methacrylate 8 percent by weight, methyl methacrylate 52 percent by weight and isobutyl methacrylate 40 percent by weight. A copolymer is formed from this monomer mixture in accordance with the same procedure as is outlined in Example I. In this case, 5 percent by weight of the catalyst AIBN is added. The copolymer produced has a glass transition temperature of 75°C and a molecular weight of 3200.

A phenolic hydroxy terminated resin is prepared as described in Example I. In this case, however, 38 grams of Epon 828 is reacted with 38 grams of 2,2' biphenol and 0.4 grams tetrabutyl ammonium iodide (catalyst) to produce a resin having a molecular weight of 752.

The ground copolymer (100 parts by weight) is added to the following materials:

| Phenolic hydroxy terminated resin | 21 parts |
| Tetrabutylammonium bromide | 2 parts |
| Polylauryl acrylate | 4 parts |
| Titanium dioxide | 30 parts |

The above ingredients are mixed together and processed in accordance with the procedure of Example I to obtain a powder coating composition. The powder coating composition is sprayed on various test panels of steel, brass, glass, zinc, aluminum, copper and bronze. The coating obtained on each test panel after curing of the powder coating composition at a temperature of 130°C for 10 minutes is of good quality and is solvent and scratch resistant.

EXAMPLE XXVIII

The procedure of Example XXVII is repeated with the exception that 5.2 parts of 2,2'-biphenol is substituted for the phenolic hydroxy terminated polymer. The resultant powder is cured at 130°C for 10 minutes on test panels described in Example I. The quality of the coating is good and it is solvent and scratch resistant.

EXAMPLE XXIX

A monomer mixture having the following composition is prepared: glycidyl methacrylate 10 percent by weight, methyl methacrylate 67 percent by weight, and n-butyl methacrylate 23 percent by weight. A copolymer is formed from this monomer mixture in accordance with the procedure as is outlined in Example I. In this case, 4% by weight of the catalyst AIBN is added. The copolymer produced has a glass transition temperature of 75°C and a molecular weight of 3000.

A phenolic hydroxy terminated resin is prepared as described in Example I. In this case, however, 38 grams of Epon 829 is reacted with 48.5 grams of 2,2' bis(4-hydroxyphenyl) butane to produce a resin having a molecular weight of 865.

The ground copolymer (100 parts by weight) is added to the following materials:

| Phenolic hydroxy terminated resin | 30 parts |
| Tetrabutylammonium chloride | 0.7 parts |
| Polybutyl acrylate | 2 parts |
| Titanium dioxide | 30 parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 180°C for 15 minutes is of good quality. Also, each of the test panels coating's is resistant to an insoluble in toluene, gasoline, methanol and butanone.

EXAMPLE XXX

The procedure of Example XXIX is repeated with the exception that 9.45 parts of 1,1' bis(4-hydroxyphenyl) cyclohexane is substituted for the phenolic hydroxy terminated resin. The resultant powders are sprayed on test panels and cured at 180°C for 15 minutes. The coatings are of good quality.

EXAMPLE XXXI

A monomer mixture having the following composition is prepared: glycidyl methacrylate 15 percent by weight, methyl methacrylate 32 percent by weight, ethyl acrylate 15 percent by weight, isobutyl acrylate 8 percent by weight, and styrene 30 percent by weight. A copolymer is formed from this monomer mixture in accordance with the same procedure as is outlined in Example I. In this case, 3 percent by weight of the catalyst AIBN is added.

A phenolic hydroxy resin is prepared as in Example I. In this case 65 grams of Epon 1001 is reacted with 45 grams of 4,4'-dihydroxydiphenyl sulfone at 150°C for 2 hours using 0.5 grams of trimethylbenzylammonium chloride as the catalyst.

The ground copolymer (100 parts by weight) is added to the following materials:

| | |
|---|---|
| Phenolic hydroxy terminated resin | 83 parts |
| Tetraethylammonium bromide | 1 part |
| Polyisodecyl methacrylate ($\overline{M}_n$=5000) | 1.5 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coatings obtained on each test panel after curing of the powder coating composition at a temperature of 120°C for 15 minutes is of good quality and has good adhesion characteristics. The powder coating composition on each panel is resistant to the solvents previously mentioned.

EXAMPLE XXXII

The procedure of Example XXXI is repeated with the exception that 11.5 parts of 4,4' dihydroxydiphenyl sulfide is substituted for the phenolic hydroxy terminated resin. The coatings, which are cured at 140°C for 15 minutes exhibit good adhesion and solvent resistance.

EXAMPLE XXXIII

A monomer mixture having the following composition is prepared: glycidyl acrylate 15 percent by weight, methyl methacrylate 40 percent by weight, 2-ethylhexyl acrylate 15 percent by weight, alpha methyl styrene 20 percent by weight and acrylonitrile 10 percent by weight. A copolymer is formed from this monomer mixture using 4 percent by weight of the catalyst AIBN. A phenolic hydroxy terminated resin is prepared as described in Example I.

The ground copolymer (100 parts by weight) is added to the following materials:

| | |
|---|---|
| Phenolic hydroxy terminated resin | 48.5 parts |
| Tetraethylammonium bromide | 0.4 parts |
| Poly(2-ethylhexyl acrylate) | 2 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at at temperature of 170°C for 20 minutes is of good quality and resistant to the aforementioned solvents.

EXAMPLE XXXIV

The procedure of Example XXXIII is repeated with the exception that 9.2 parts of 1,3-dihydroxynaphthalene is substituted for the phenolic hydroxy terminated resin. The resultant powders are applied to test panels and cured at 170°C for 20 minutes. The coatings exhibit good adhesion and excellent solvent resistance.

EXAMPLE XXXV

A monomer mixture having the following composition is prepared: glycidyl methacrylate 20 percent by weight, butyl acrylate 40 percent by weight, methyl methacrylate 10% by weight and styrene 30 percent by weight. A copolymer is formed from this monomer mixture in accordance with the same procedure as is outlined in Example I. In this case, 4 percent by weight of the catalyst AIBN is added. The copolymer produced has a glass transition temperature of 40°C and a molecular weight of 3000. A phenolic hydroxy terminated resin is prepared as described in Example I.

The ground copolymer (100 parts by weight) is added to the following materials:

| | |
|---|---|
| Phenolic hydroxy terminated resin | 82.4 parts |
| Tetraethylammonium bromide | 0.5 parts |
| Polylauryl acrylate | 1.0 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 180°C for 10 minutes is of good quality and is resistant to the aforementioned solvents.

EXAMPLE XXXVI

The procedure of Example XXXV is repeated with the exception that 13.7 parts of 4,4'-biphenol is substituted for the phenolic hydroxy terminated resin. The powders are applied to substrates and cured at 170°C for 20 minutes. The coatings exhibit good adhesion and solvent resistance.

EXAMPLE XXXVII

A monomer mixture having the following composition is prepared: glycidyl methacrylate 15 percent by weight, butyl methacrylate 15 percent by weight, ethyl acrylate 15 percent by weight, methyl methacrylate 30 percent by weight and styrene 25 percent by weight. A copolymer is formed from this monomer mixture in accordance with the same procedure as is outlined in Example I. In this case, 4 percent by weight of the catalyst AIBN is added. A phenolic hydroxy terminated resin is prepared as described in Example XI.

The ground copolymer (100 parts by weight) is added to the following materials:

| | |
|---|---|
| Phenolic hydroxy terminated resin | 43 parts |
| Tetraethylammonium bromide | 1.0 parts |
| Polylauryl acrylate | 0.5 parts |
| Titanium dioxide | 30 parts |

The above ingredients are mixed together and processed in accordance with the procedure of Example I to obtain a powder coating composition. The powder coating composition is sprayed on various test panels of steel, glass, brass, zinc, aluminum, copper and bronze. The coating obtained on each test panel after curing of the powder coating composition at a temperature of 130°C for 30 minutes is of good quality and resistant to the aforementioned solvents.

EXAMPLE XXXVIII

The procedure of Example XXXVII is repeated with the exception that 13.8 parts of dihydroxydiphenyl sulfone is substituted for the phenolic hydroxy terminated resin. Cured coatings formed from the powders exhibit good adhesion and solvent resistance.

EXAMPLE XXXIX

A monomer mixture having the following composition is prepared: glycidyl methacrylate 15 percent by weight, 2-ethylhexyl acrylate 10 percent by weight, methyl methacrylate 50 percent by weight, methacrylonitrile 15 percent by weight and alpha methyl styrene 10 percent by weight. A copolymer is formed from this monomer mixture in accordance with the same procedure as is outlined in Example I. In this case, 4 percent by weight of the catalyst AIBN is added. A phenolic hydroxy terminated resin is prepared as described in Example V.

The ground copolymer (100 parts by weight) is added to the following materials:

| | |
|---|---|
| Phenolic hydroxy terminated resin | 108 parts |
| Tetraethylammonium bromide | 0.5 parts |
| Polylauryl acrylate | 2.5 parts |
| Titanium dioxide | 30 parts |

The above ingredients are mixed together and processed in accordance with the procedure of Example I to obtain a powder coating composition. The powder coating composition is sprayed on various test panels of steel, glass brass, zinc, aluminum, copper and bronze. The coating obtained on each test panel after curing of the powder coating composition at a temperature of 135°C for 30 minutes is of good quality. Also, the coatings are resistant to an insoluble in toluene, gasoline, methanol and butanone.

EXAMPLE XXXX

The procedure of Example XXXIX is repeated with the exception that 10.0 parts of Bis(4-hydroxyphenyl) methane is substituted for the phenolic hydroxy terminated resin. Cured coatings show good adhesion and solvent resistance.

EXAMPLE XXXXI

A monomer mixture having the following composition is prepared: glycidyl acrylate 30 percent by weight, methyl methacrylate 60 percent by weight, and n-butyl methacrylate 10 percent by weight. A copolymer is formed from this monomer mixture in accordance with the procedure as is outlined in Example I. In this case, 4 percent by weight of the catalyst AIBN is added. A phenolic hydroxy terminated resin is prepared as described in Example V.

The ground copolymer (100 parts by weight) is added to the following materials:

| | |
|---|---|
| Phenolic hydroxy terminated resin | 200 parts |
| Tetrabutylammonium chloride | 0.7 parts |
| Polybutyl acrylate | 2 parts |
| Titanium dioxide | 30 parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 170°C for 15 minutes is of good quality. Also, each of the test panels coating's is resistant to and insoluble in toluene, gasoline, methanol and butanone.

EXAMPLE XXXXII

A monomer mixture having the following composition is prepared: glycidyl methacrylate 35 percent by weight, methyl methacrylate 55 percent by weight, and n-butyl methacrylate 10 percent by weight. A copolymer is formed from this monomer mixture in accordance with the procedure as is outlined in Example I. In this case, 4 percent by weight of the catalyst AIBN is added. A phenolic hydroxy terminated resin is prepared as described in Example XI.

The ground copolymer (100 parts by weight) is added to the following materials:

| | |
|---|---|
| Phenolic hydroxy terminated resin | 107 parts |
| Tetrabutylammonium chloride | 0.7 parts |
| Polybutyl acrylate | 2 parts |
| Titanium dioxide | 30 parts |

The above ingredients are mixed together and processed in accordance with the procedure of Example I to obtain a powder coating composition. The powder coating composition is sprayed on various test panels. The coating obtained on each test panel after curing of the powder coating composition at a temperature of 175°C for 18 minutes is of poor quality and shows low impact strength.

EXAMPLE XXXXIII

The procedures of Example I–VI are repeated with the exception that an equivalent amount of polydimethyl siloxane ($\overline{M}_n$=5,000) is substituted for the polylauryl flow control agent.

EXAMPLE XXXXIV

Examples I through XXXXIII are repeated with exception that the flow control agent is omitted from each powder composition. The powders are sprayed on steel test panels and cured to form films thereon.

EXAMPLE XXXXV

The procedure of Example VII is repeated with the exception that 0.8 parts of polydiphenylsiloxane ($\overline{M}_n$=10,000) is substituted for the polybutylacrylate.

EXAMPLE XXXXVI

The procedure of Example IX is repeated with the exception that 0.5 parts of polymethylphenylsiloxane ($\overline{M}_n$=8,000) is used as the flow control agent.

EXAMPLE XXXXVII

The procedure of Example XI is repeated with the exception that 0.4 parts of poly(3,3,3-trifluoropropylmethyl siloxane) ($\overline{M}_n$=6,000) is substituted as the flow control agent.

EXAMPLE XXXXVIII

The procedure of Example XV is repeated with the exception that 0.7 parts of poly(perfluorodimethyl siloxane) ($\overline{M}_n$=11,000) is substituted for the flow control agent.

EXAMPLE XXXXIX

The procedure of Example XIX is repeated with the exception that 0.30 parts of poly(pentafluorophenylmethyl siloxane) ($\overline{M}_n$=15,000) is substituted as the flow control agent.

In view of this disclosure, many modifications of this invention will be apparent to those skilled in the art. It is intended that all such modifications which fall within the true scope of this invention be included within the terms of the appended claims.

We claim:

1. A powder coating composition which, exclusive of pigments and other non-reactive components, comprises a coreactable mixture of:
   A. a copolymer of about 8 to about 30 weight percent of a glycidyl ester of a monoethylenically unsaturated acid and about 92 to about 70 weight percent of other monoethylenically unsaturated monomers, said copolymer having a glass transition temperature in the range of 40° to 90°C and a molecular weight ($\overline{M}_n$) in the range of 2500 to 8500; and
   B. a phenolic hydroxy terminated compound in the amount of about 0.8 to about 1.2 phenolic hydroxy groups for each epoxy group in the copolymer.

2. A powder coating composition in accordance with claim 1 wherein said copolymer has a glass transition temperature between about 50° and about 80°C and a molecular weight ($\overline{M}_n$) between about 3000 and about 6500, said glycidyl ester being present in said copolymer from at least about 10 percent by weight to no more than about 25 percent by weight.

3. A powder coating composition in accordance with claim 1 wherein said copolymer has a glass transition temperature between about 50° and about 70°C and a molecular weight ($\overline{M}_n$) in the range of about 3000 to about 4000, said glycidyl ester being present in said copolymer from at least about 12 percent by weight to no more than about 20 percent by weight.

4. A powder paint composition in accordance with claim 1 wherein said phenolic hydroxy terminated compound is a phenolic hydroxy terminated resin.

5. A powder coating composition in accordance with claim 4 wherein said phenolic hydroxy terminated resin is a polyether.

6. A powder coating composition in accordance with claim 4 wherein said phenolic hydroxy terminated resin is a polyether having a molecular weight between about 600 and about 3000.

7. A powder coating composition in accordance with claim 4 wherein said phenolic hydroxy terminated resin is a polyether produced by reacting about one equivalent weight of a diepoxy resin with about 1½ to 3 equivalent weights of a diphenol.

8. A powder coating composition in accordance with claim 4 wherein said phenolic hydroxy terminated resin is a polyether produced by reacting about 1 equivalent weight of a diepoxy resin having a molecular weight in the range of from about 250 to about 2000 with about 1½ to 3 equivalent weights of a diphenol having a molecular weight in the range of from about 110 to about 550.

9. A powder coating composition in accordance with claim 1 wherein said phenolic hydroxy terminated compound is a diphenol.

10. A powder coating composition in accordance with claim 9 wherein said diphenol is selected from the group consisting of: bisphenol A; dihydroxydiphenyl sulfone; 1,1' bis(4-hydroxyphenyl) cyclohexane; 2,2'-biphenol; 4,4'-biphenol; 1,3-dihydroxynaphthalene; bis(2-hydroxyphenyl) methane; 4,4' dihydroxydiphenyl sulfide; 4,4'dihydroxydiphenol oxide; bis(4-hydroxyphenyl) methane; hydroquinone; and 2-2'-bis(4-hydroxyphenyl) butane.

11. A powder coating composition in accordance with claim 1 wherein said monoethylenically unsaturated monomers consist essentially of monofunctional, alpha-beta olefinically unsaturated monomers.

12. A powder coating composition in accordance with claim 11 wherein said monofunctional, alpha-beta olefinically unsaturated monomers are acrylates.

13. A powder coating composition in accordance with claim 12 wherein said acrylates consist essentially of esters of $C_1$–$C_8$ monohydric alcohols and acrylic or methacrylic acid.

14. A powder coating composition in accordance with claim 11 wherein said monofunctional, alpha-beta olefinically unsaturated monomers consist essentially of a mixture of acrylates and vinyl hydrocarbons, said acrylates comprising greater than 50 weight percent of the monomer content of the copolymer.

15. A powder coating composition in accordance with claim 14 wherein said vinyl hydrocarbons are selected from the group consisting of styrene, alpha methyl styrene, vinyl toluene, t-butyl styrene and chlorostyrene.

16. A powder coating composition in accordance with claim 11 wherein said copolymer includes up to 35 weight percent of modifying monomers selected from the group consisting of vinyl chloride, acrylonitrile, methacrylonitrile and vinyl acetate.

17. A powder coating composition which, exclusive of pigments and other non-reactive components, comprises a coreactable mixture of:
   A. a copolymer of about 10 to about 25 weight percent of a glycidyl ester of a monoethylenically unsaturated acid and about 90 to about 75 weight percent of other monoethylenically unsaturated monomers, said copolymer having a glass transition temperature between about 50° and about 80°C and a molecular weight ($\overline{M}_n$) between about 2500 and about 8500; and B. a phenolic hydroxy terminated resin comprising a polyester formed by reacting about one equivalent weight of a diepoxy resin with about one and a half to three equivalent weights of a diphenol, said phenolic hydroxy terminated resin being present in the amount of about 0.8 to about 1.2 phenolic hydroxy groups for each epoxy group in the copolymer.

18. A powder coating composition in accordance with claim 17 wherein said copolymer has a glass transition temperature between about 50° and about 70°C and a molecular weight ($\overline{M}_n$) in the range of about 3,000 to about 4,000, said glycidyl ester being present in said copolymer from at least about 12 weight percent to no more than about 20 weight percent.

19. A powder coating composition which, exclusive of pigments and other non-reactive components, comprises a coreactable mixture of:

A. a copolymer of about 10 to about 25 weight percent of glycidyl ester of a monoethylenically unsaturated acid and about 90 to about 75 weight percent of other monoethylenically unsaturated monomers, said copolymer having a glass transition temperature between about 50° and about 80°C and a molecular weight ($\overline{M}_n$) between about 3000 and about 6500; and B. A diphenol selected from the group consisting of: bisphenol A; dihydroxydiphenyl sulfone; 1,1'bis(4-hydroxyphenyl) cyclohexane; 2,2'-biphenol; 4,4'-biphenol; 1,3-dihydroxynaphthalene; bis(2-hydroxyphenyl) methane; 4,4' dihydroxydiphenyl sulfide; 4-4'dihydroxydiphenol oxide; bis(4-hydroxyphenyl) methane; hydroquinone; and 2-2'-bis(4-hydroxyphenyl) butane, said diphenol being present in the amount of about 0.8 to about 1.1 phenolic hydroxy groups for each epoxy group in the copolymer.

20. A powder coating composition in accordance with claim 19 wherein said copolymer has a glass transition temperature between about 50° and about 70°C and a molecular weight ($\overline{M}_n$) in the range of about 3,000 to about 4,000, said glycidyl ester being present in said copolymer from at least about 12 weight percent to no more than about 20 weight percent.

* * * * *